United States Patent [19]

Ebrahim et al.

[11] Patent Number: 5,930,807
[45] Date of Patent: Jul. 27, 1999

[54] APPARATUS AND METHOD FOR FAST FILTERING READ AND WRITE BARRIER OPERATIONS IN GARBAGE COLLECTION SYSTEM

[75] Inventors: Zahir Ebrahim, Mountain View; Sanjay Vishin, Sunnyvale, both of Calif.

[73] Assignee: Sun Microsystems, Mountain View, Calif.

[21] Appl. No.: 08/842,068

[22] Filed: Apr. 23, 1997

[51] Int. Cl.$^6$ ...................................................... G06F 17/30
[52] U.S. Cl. .............................................................. 707/206
[58] Field of Search ..................... 707/206; 711/133–136, 711/159–160; 395/670, 652

[56] References Cited

U.S. PATENT DOCUMENTS

| | | | |
|---|---|---|---|
| 4,757,438 | 7/1988 | Thatte et al. | 364/200 |
| 4,907,151 | 3/1990 | Bartlett | 364/200 |
| 4,920,483 | 4/1990 | Pogue et al. | 364/200 |

(List continued on next page.)

OTHER PUBLICATIONS

Moon, David A., "Garbage Collection in a Large Lisp System", *ACM* (1984), pp. 235–246.

Aho, Alfred V., et al., "Compilers Principles Techniques, and Tools", Addison–Wesley, Mar. 1988, Ch. 10, pp. 585–586, 592–599, 605–607.

Karen, et al., "Garbage Collection for Prolog Based on WAM", *Communications of the ACM*, vol. 31, Issue 6 (Jun. 1, 1988).

Courts, Robert, "Improving Locality of Reference in a Garbage–Collecting Memory Management System", *Communications of the ACM*, Vo. 31, No. 9 (1988), pp. 1128–1138.

Grehan, Rick, "Hands On, Some Assembly Required; If Memory Serves . . . ", *Byte* (Aug. 1989), pp. 279–280, 282, 284, 337.

Grehan, Rick, "Hands On, Some Assembly Required;Virtually Virtual Memory", *Byte* (Sep. 1990), pp. 455–456, 458, 460, 462, 464.

Kuechlin, Wolfgang W., "On Multi–Threaded List–Processing and Garbage Collection", *IEEE* (1991), pp. 894–897.

Booch, Grady, "Object Oriented Design with Applications", Benjamin/Cummings (1991).

Imai, Akira, et al., "Evaluation of Parallel Copying Garbage Collection on a Shared–Memory Multiprocessor", *IEEE* (1993), pp. 1030–1040.

(List continued on next page.)

*Primary Examiner*—Thomas G. Black
*Assistant Examiner*—Uyen Le
*Attorney, Agent, or Firm*—Steven F. Caserza; Flehr Hobach Test Albritton Herbert LLP

[57] ABSTRACT

In a computer system that utilizes write or read barriers to perform a garbage collection function, instruction execution logic avoids unnecessary calls to the write or read barrier procedure. Each object's header includes a State flag. Each object reference also includes a State flag. Each time an instruction that is the subject of a write or read barrier (e.g., a object reference write instruction) is executed, the State flag of the object reference being processed is inspected by the instruction execution logic. If the State flag in the object reference is set, the write or read barrier procedure is not invoked, because the target object has already been processed by a previous call to the write or read barrier procedure. Otherwise the write or read barrier procedure is invoked. The write or read barrier procedure first checks the State flag in the target object's header. If it is set, the State flag in the target object reference is set and then the procedure exits. Otherwise, if the State flag in the target object header is not set, a predefined garbage collection function is performed and then the State flag in the target object's header and the State flag in the target object's reference are both set. In some embodiments the setting of the State flags is conditional on the outcome of the garbage collection operation performed by the write or read barrier procedure.

20 Claims, 11 Drawing Sheets

U.S. PATENT DOCUMENTS

| | | | |
|---|---|---|---|
| 4,961,134 | 10/1990 | Crus et al. | 364/200 |
| 5,088,036 | 2/1992 | Ellis et al. | 395/425 |
| 5,222,221 | 6/1993 | Houri et al. | 395/375 |
| 5,283,878 | 2/1994 | Murray | 395/425 |
| 5,293,614 | 3/1994 | Ferguson et al. | 395/600 |
| 5,301,288 | 4/1994 | Newman et al. | 395/400 |
| 5,355,483 | 10/1994 | Serlet | 395/650 |
| 5,408,650 | 4/1995 | Arsenault | 395/575 |
| 5,418,921 | 5/1995 | Cortney et al. | 395/425 |
| 5,446,901 | 8/1995 | Owicki et al. | 395/700 |
| 5,535,329 | 7/1996 | Hastings | 395/183.11 |
| 5,560,003 | 9/1996 | Nilsen et al. | 395/600 |
| 5,561,786 | 10/1996 | Morse | 395/497.01 |
| 5,566,321 | 10/1996 | Pase et al. | 395/480 |
| 5,761,670 | 6/1998 | Joy | 707/103 |
| 5,845,298 | 12/1998 | O'Connor et al. | 707/206 |
| 5,848,423 | 12/1998 | Ebrahim et al. | 707/206 |

OTHER PUBLICATIONS

Holzle, Urs, et al., "A Fast Write Barrier for Generational Garbage Collectors", *OOPSLA '93 Garbage Collection Workshop* (Oct. 1993).

Bott, Ed, Windows; Windows' Invisible Wall: The 64K Barrier, System Resources are the Hidden Memory Limit that Microsoft Forgot:, *PCContact* (Mar. 1994), pp. 210, 212.

Shaw, Richard Hale, "An Introduction to the Win32 API", *PC Magazine* vol. 13, No. 8, pp. 291–295.

Barrett, David A., "Improving the Performance of Conservative Generational Garbage Collection", 1995 Thesis.

Wilson, Paul R., et al., "Dynamic Storage Allocation: A Survey and Critical Review", University of Texas at Austin, 1995.

Jones, Richard et al., "Garbage Collection, Algorithms for Automatic Dynamic Memory Management", John Wiley & Sons (1996).

Gadbois, David et al., "GC FAQ", http://www.centerline.com/people/chase/GC/GC–faq.html (Jan. 6, 1997).

Caro, Alejandro, "A Novel 64 Bit Data Representation for Garbage Collection and Synchronizing Memory", *Computation Structures Group Memo 396* (Apr. 9, 1997).

Harbaugh, Sam et al., "HeapGuard™, Eliminating Garbage Collection in Real–Time Ada Systems", *Integrated Software,* Inc., pp. 704–708.

Wallace, David Vinayak et al., "Simple Garbage Collection in G++", Draft, Rev. 1.1.

Jones, Richard et al., "Garbage Collection, Algorithms for Automatic Dynamic Memory Management", John Wiley & Sons, Chs. 6, 7 and 8.

APPARATUS AND METHOD FOR FAST FILTERING READ AND WRITE BARRIER OPERATIONS IN GARBAGE COLLECTION SYSTEM

The present invention relates generally to "garbage collection" systems and methods that automatically recover memory used by objects no longer in use by the operating system and application programs in a computer system, and more particularly to a system and method for reducing processor overhead associated with garbage collection.

BACKGROUND OF THE INVENTION

Basic Explanation of Garbage Collection

Garbage collection is a complex topic that has been the subject of hundreds of technical articles and at least one text book. The following is a simplified explanation of dynamic memory allocation and garbage collection. For a more complete explanation of basic garbage collection technology, see U.S. Pat. No. 5,088,036, and Richard Jones and Rafael Lins, "Garbage Collection," John Wiley & Sons Ltd., 1996, both of which are incorporated by reference as background information.

Referring to FIG. 1, there is shown a typical multitasking computer system 100 that has a CPU 102, user interface 106, and memory 108 (including both fast random access memory and slower non-volatile memory). The memory 108 stores an operating system 110 and one or more mutator tasks 112 (also called processes or threads). Each active task in the system is assigned a portion of the computer's memory, including space for storing the application level code 112 executed by the task, space for storing a storing a program stack 114, and a heap 116 that is used for dynamic memory allocation.

The program stack 114 need not be in contiguous pages of memory 108, and if not contiguous, the pages or possibly larger contiguous chunks of stack storage are linked together using well known prior art mechanisms.

The CPU 102 includes an instruction cache 120 for providing instructions to an instruction decoder and execution logic 122. The CPU also includes a stack cache 124 for storing in high speed cache memory a portion of the program stack 114, and a set of registers 126 for storing data values, object references 128 and the like. The program stack 114, including the portion in the stack cache 124, is used to temporarily store various data structures and parameters, which including activation records (sometimes called "frames") that are pushed on the program stack each time a method or other procedure is invoked. Some of the data values pushed onto the program stack are object references 130.

During garbage collection, the program stack 114 and the registers 126 in the CPU 102 are typically used to locate a "root set" of object references or pointers used by the mutator task 112. A root set locator procedure in the garbage collector will typically generate and store a root set list 132 of the located root set object references.

It should be understood that FIG. 1 represents only one of many ways in which memory may be allocated for storing the roots, code and heap associated with a task or a set of tasks. Also, it should be understood that multiple processes may be executing simultaneously in a computer system, each with its own address space that includes the same types of items as shown in the memory 108 of FIG. 1.

For the purposes of this description, the terms "task", "mutator", "mutator thread", "thread" and "process" are used interchangeably. Tasks and programs are sometimes called mutators because they change or "mutate" the contents of the heap 116. The term "thread" relates to the continuity of a task or process, especially in multithreaded environments in which each process is periodically interrupted by other ones of the processes in the system.

The term "object" is herein defined to mean any data structure created by a program or process.

The terms "reference" and "object reference" are used interchangeably to describe a data structure that includes a pointer to an object. While the term "pointer" or "object pointer" are sometimes used interchangeably with "reference" and "object reference", object references may include information in addition to a pointer. An object reference may be direct or indirect. A direct object reference directly points to an object header, while an indirect object reference points to an object handle. In this document the term "object reference" refers to both types. While in the preferred embodiment object handles are not shown, the present invention is equally applicable to systems in which object handles are used.

The terms "write" and "store" are used interchangeably in this document to refer to the operation in which data is stored at a specified location in a computer's memory, or in a register. The terms "write operation" and "store operation" are also used interchangeably.

The term "target object" is used to mean the object into which a datum is being written or from which a datum is being read. Equivalently, the target object is the one referenced by an object reference.

The terms "object reference write instruction" is used to refer to an instruction that uses an object reference to locate an object into which a datum is to be written. The object reference used by the write operation to locate the object is sometimes called the target object reference.

The terms "instruction execution logic" and "the hardware" refer to all the internal logic in a microprocessor such as its instruction pipeline, any load and store buffers, state machines, microcoded execution logic, stack management logic, and so on, that may be needed to completely fetch and execute an instruction from an instruction cache.

The terms "state flag," "state bit," "S flag," and "S bit" are used interchangeably to refer to the flag or bit in an object reference and in the object header in the preferred embodiment of the present invention. When a distinction between locations of the state flags needs to be made the terms "object reference state flag" and "object header state flag" are used. This flag or bit indicates that an associated object has been "stored into" or is "dirty" or has been "accessed" or "touched, to indicate that the object has been written into, or read from, by the mutator thread between the last garbage collection cycle in which this object was examined and the next such garbage collection cycle. For garbage collectors that use read or write barrier operations to trigger a garbage collection method specific recording operation when the object pointed to by an object reference is written to or read from, the state flag also acts as a filter to avoid triggering the read or write barrier operations once the state flag is set. The object reference state flag may be set by hardware, or the software within the read or write barrier procedure, but it is examined in hardware. In a second embodiment, in which the state flag is used as a "dirty" or "accessed" bit, the object reference state flag is only set in the hardware on an object reference write or read instruction, but is examined by garbage collection software. In a third embodiment, the above discussed operations are performed directly on the object header state flag by the instruction execution logic hardware instead of being performed on an object reference state flag.

When the task associated with the heap 116 needs space for storing an array or other program "object", a Memory Allocator routine 140 in the operating system is called. The memory allocator 140 responds by allocating a block of unused memory in the heap 116 to the task. Additional requests for memory will result in the allocation of additional memory blocks. Clearly, if the task continues to ask for more memory, all the space in the heap 116 will eventually be used and the task will fail for lack of memory. Therefore space must be restored by either explicit actions of the program, or some other mechanism.

It is well known that most tasks "abandon" much of the memory space that is allocated to them. Typically, the task stores many program objects in allocated memory blocks, and discards all references to many of those objects after it has finished processing them because it will never need to access those objects again.

An object for which there are no references (sometimes called pointers) is often termed an "inaccessible object", and the memory space it occupies is "inaccessible" to the task that once used it.

The solution to this problem is to recover blocks of memory space in the heap 116 that are no longer being used by the task. Garbage collection is the term used to refer to automatic methods of recovering unused memory in the heap 116. Garbage collector 142 generally gathers and recovers unused memory upon the occurrence of a predefined event, such as the expiration of a predefined time period, or usage of a certain amount of the available heap. Thus, FIG. 1 shows that the operation system 110 includes a garbage collector 142.

Thus, the purpose of the garbage collector 142 is to recover unused or abandoned portions of memory in the heap 116 so that the task using the heap will not run out of memory.

While there are a number of different garbage collection methodologies, the easiest one to explain is the Stop and Copy garbage collection technique. In this scheme the heap is divided into two halves, also called semi-spaces, and the program uses only one semi-space at a time. Stop and Copy garbage collectors reclaim unused memory and compact the program accessible memory used by a task by copying all "accessible objects" in the current semi-space to a contiguous block of memory in the other semi-space, and changing all references to the accessible objects so as to point to the new copy of these objects. An accessible object is any object (i.e., block of memory) that is referenced, directly or indirectly, by the "roots" or "root set" of the task. Typically, the "root set" of a task with respect to garbage collection is a set of object references stored in known locations, in the program stack 114 and registers 126 used by the task, which point to objects used by a task. Many of those objects, in turn, will contain references to other objects used by the task. The chain, or directed graph, of object references emanating from the root set indirectly points to all of the accessible objects in the heap.

The entire set of objects referenced by these object references (pointers) is called the set of accessible objects. Inaccessible objects are all objects not referenced by the set of object references derived from the root set.

By copying all accessible objects to a new contiguous block of memory in the heap, and then using the new copy of the objects in place of the old copy, the Stop and Copy garbage collector eliminates all unused memory blocks in the heap. It also "compacts" the memory storage used by the task so that there are no "holes" between accessible objects. Compaction is a desirable property because it puts all of the memory available for allocation to a task in a contiguous block, which eliminates the need to keep track of numerous small blocks of unallocated memory. Compaction also improves virtual memory performance.

Also shown in FIG. 1 are aspects of a computer system that is set up to execute "Java" (a trademark of Sun Microsystems, Inc.) bytecode programs. In particular, the operating system of such a system includes:

a bytecode program verifier 144 for verifying whether or not a specified Java bytecode program satisfies certain predefined integrity criteria;

a class loader 146, which loads object classes into a user's address space and utilizes the bytecode program verifier 144 to verify the integrity of the methods associated with each loaded object class; and a bytecode program interpreter (not shown) for executing Java bytecode programs. If the instruction decoder and execution logic 122 is designed to execute Java bytecode instructions, a bytecode program interpreter is not needed.

Furthermore, in a computer system set up to execute Java bytecode programs, memory 108 will include at least one class repository 150, for locally storing object classes 152 in use and/or available for use by users of the computer system 100. The heap 116 acts as an object repository for storing objects, which are instances of objects of the object classes stored in the class repository 150.

When a computer system supports multithreading, it is possible for two or more threads of execution to share a single address space. In such systems, each thread of execution is typically considered to be a separate mutator task, and each has its own stack and register set.

Referring to FIG. 2, there is shown a conventional object 153 and an object reference 154 that includes a pointer 155 to the object 153. For purposes of this explanation, it is assumed that the computer system in which the object 153 and object reference 153 are stored has a word size of 32 or 64 bits, that each object reference includes a number of unused bits 156, 157. Each object 153 includes a header 158 and a body 159. The contents of the object header 150 are controlled by the operating system and are generally not accessible to users and application programs. The object body 159 is the part of the object that is visible to application programs.

While FIG. 2 shows an object reference pointing directly to an object body, the subsequent discussion is also applicable when the object reference points to an object via an object handle. Also, while the object header is shown in FIG. 2 as being located next to the object body, it can be located anywhere, including in an object handle where present.

For the purposes of this document, only one part of the object header 158 is of interest. In systems using "generational garbage collection", the header 158 of each object may include garbage collection information (gc info) 148. In particular, the gc info 148 in the object header 158 may indicate (A) the heap generation in which the object is stored, and (B) a state flag 149, the use of which will be described next.

Generational Garbage Collection and Remembered Sets

The following description of generational garbage collection is, by necessity, a brief overview that focuses only on the aspects of generational garbage collection most relevant to the present invention. For a more complete description of the state of the art prior to the present invention, the reader is invited to read Chapter 7, "Generational Garbage Collection," in Richard Jones and Rafael Lins, "Garbage Collection," John Wiley & Sons Ltd., 1996.

Referring to FIG. 3, one way to make garbage collection more efficient, and to reduce the length of system pauses caused by garbage collection, is to reduce the number of objects that need to be processed during each garbage collection cycle using a scheme known as generational garbage collection. In a system using generational garbage collection, the heap 116 is divided not into just new space 160 and old space (162–166), but the old space in which all objects are located is divided into two or more generations. FIG. 3 shows a system in which the old space portion of the heap has been divided into three generations: Generation 0 (162) stores the youngest objects, Generation 1 (164) stores objects that have persisted for at least N garbage collection cycles (where N is typically a value between 1 and 4), and Generation 2 (166) stores the oldest objects in the system. Objects in the youngest generation 162 are typically garbage collected five to ten times more often than objects in the second youngest generation 164, and objects in the second youngest generation 164 may be garbage collected five to ten times more often than objects in the oldest generation 166. Since most objects are very short lived, very few objects are promoted to the oldest generation. More importantly, long lived objects in the older heap generations are processed by the garbage collector (which generally involves copying the object and tracing all its object references) relatively infrequently, substantially reducing the overhead (i.e., the number of computational cycles) required to perform periodic garbage collection.

The simplest promotion policy is to advance all live objects from one generation to the next oldest generation each time a generational garbage collection is performed. Another technique is to divide the youngest generation into an object creation space and an aging space. Objects are initially allocated in the creation space. The aging space holds survivors from the creation space. Objects are promoted to the next older generation only after surviving N garbage collection cycles.

One of the biggest problems with generational garbage collectors is handling intergenerational object references. More specifically, the only reference(s) to an object in one generation may be stored in object(s) in another generation. FIG. 3 shows a number of intergenerational references 170. If the only reference to an object is an intergenerational reference, or more generally, if the only path from a root set reference to an object requires traversal of an intergenerational object reference, the object would be improperly deleted by garbage collection unless all intergenerational references were taken into account during garbage collection. However, scanning the older generation heap areas for intergenerational references each time a younger generation heap area is garbage collected would take away some of the efficiency achieved by using generational garbage collection.

If scanning older generations during collection of younger generations is ruled out as too inefficient, then another mechanism has to be developed to keep track of references in older generational objects to newer generational objects. For instance, the garbage collector may maintain an "entry table" in each generation of the heap other than the oldest generation. The entry table is used to store indirect pointers from older generational objection to objects in the younger generation. An advantage of the entry table scheme is that when a younger generation is garbage collected, it is only necessary to scavenge its entry table rather than to search every older generation.

However, another scheme, called the "remembered set" scheme, is more computationally efficient than the entry table scheme. In particular, a "remembered set" 172 is used to store a pointer to each older generation object that contains a reference to a younger generational object. In the "remembered set" scheme, a software procedure called a "write barrier" is used to process every object reference write operation to update the remember set 172. The write barrier procedure checks to see if the reference being stored points from a older generation object to a newer generation object, and also checks to see if a pointer to the older generation object is already stored in the remembered set. If the reference being stored is an "older generation to newer generation" type object reference, and the older generation object is not already listed in the remembered set, a pointer to the older generation object is stored by the write barrier procedure in the remembered set 172.

To reduce the overhead associated with storing object references, a State flag 149 (see FIG. 2) is stored in the header of each object, and that State flag is set by the write barrier procedure whenever a pointer to the object is stored in the remembered set. Furthermore, whenever an object reference write operation is performed, the write barrier procedure immediately exits whenever it detects a set State Flag in the header of the older generation object in which a pointer is being written.

During garbage collection off all generations other than the oldest generation, the pointers in the remembered set 172 are treated as part of the root set of object pointers. Furthermore, during garbage collection objects referenced by the remembered set 172 are removed from the remembered set if (A) they no longer contain pointers to any younger generation objects, or (B) the referenced object has itself been garbage collected. In case (A), the object's State flag 149 is also cleared. Also, when garbage collection causes an object to be promoted to an older generation, if the object contains a pointer to a younger generation object, the garbage collector adds a reference to the promoted object to the remembered set 172 and also sets the promoted object's State flag 149.

Read and Write Barriers For Incremental Garbage Collection

The present invention is equally applicable to systems using incremental garbage collection, which is a collection of techniques for performing garbage collection in a manner that is interleaved in small increments with mutator functions. Incremental garbage collection is used primarily in systems that require real-time system performance. In most copying versions of incremental garbage collection, every time an existing object is accessed, the existing object is copied from old space to new space unless the object has already been moved to new space during the current collection cycle. There are also non-copying and non-compacting versions of incremental garbage collection. Incremental garbage collection reduces the length of any single system pause caused by garbage collection, but may increase latency in the execution of individual mutator task instructions. The procedure or set of instructions used for performing incremental garbage collection are sometimes called "read barrier" instructions, since they are typically performed in conjunction with object field read instructions.

Incremental collection may also be performed using write barrier instructions, which are typically performed in conjunction with object reference write instructions.

Read barriers and write barriers are expensive in that they substantially increase the processor time required to perform object reference read or write operations. If a read or write barrier is performed on the same object many times during a single garbage collection cycle, that may also increase garbage collection time, for instance by creating numerous duplicate entries in a "visited object" list that is later processed by the garbage collector.

Card Marking

Card marking is a garbage collection scheme in which a read or write barrier is used to mark each "card" or "memory unit" known to contain an object reference that is processed during a garbage collection cycle. Typically, each "card" is a portion of the heap of size $2^N$ bytes, where N is an integer value. Cards size can vary significantly from one implementation to another, ranging from very small cards, perhaps as small as 16 memory words (e.g., 64 bytes), to relatively large cards, perhaps as large as a full memory page (e.g., 4096 bytes). In a read barrier implementation, every time an object reference is read, the "card" in which the object reference is located is marked by setting a corresponding flag in a flag array. Similarly, in a write barrier implementation, each time an object is stored into, the corresponding card in which the object reference (or object) is located is marked.

During garbage collection, the garbage collector inspects the flag array for set flags, and then processes every card whose flag is set so as to locate the object references in those cards. The object references found in the marked cards are treated as being part of the root set for the current garbage collection cycle.

As taught by the present invention, card marking is inefficient to the extent that read or write barriers are executed for cards that have already been marked during the current garbage collection cycle. This discussion of card marking is highly simplified, and meant only to describe the aspects of card marking believed to be most relevant to the present invention.

SUMMARY OF THE INVENTION

In summary, the present invention is directed at any garbage collection system that uses read barriers and/or write barriers to keep track of object references to be used as part of the root set during a current garbage collection cycle. The present invention makes such systems more efficient by using instruction execution logic to avoid invoking a read or write barrier procedure for many object reference read or write operations. In the present invention, each object's header includes a State flag that indicates whether an object reference is already marked or otherwise known to be included in a root set. Each object reference also includes a State flag.

In a write barrier implementation, after an object reference has been used to locate the target object into which another object pointer is written, the State flag in that object reference (A) indicates whether the target object is already marked (e.g., referenced by the system's remembered set), and (B) mirrors the State flag in the header of the target object. The State flag of an object reference mirrors the State flag in the object header only after a write barrier has been performed on object reference.

Each time a datum is written into a field of a target object, the State flag of the object reference used to locate the target object is inspected by the instruction execution logic. If the State flag is set, then the write barrier procedure is not called. If the State flag is not set, the write barrier procedure is invoked by the instruction execution logic. The write barrier procedure first checks the State flag in the target object's header. If that State flag is set, the target object is already referenced by the remembered set, and therefore the State flag in the target object reference is set. Otherwise, if the State flag in the target object header is not set, the remaining portion of the write barrier procedure is executed.

In a generational garbage collection embodiment using a remembered set mechanism, the write barrier procedure determines if the datum being written into the target object in an intergenerational pointer. If so, a pointer to the target object is added to the remembered set, and the State flag in the target object's header and the State flag in the target object's reference are both set. If not, the write barrier procedure exits without updating the remembered set or the State flags of the target object and object reference.

In a preferred embodiment, the instruction decoder or other CPU logic of the computer system checks the object reference State flag for each object into which a datum is being written. If the object reference State flag is not set, the write barrier procedure is called; if the State flag is set, the write barrier procedure is not called. The write barrier procedure, when called, sets the State flag in the object pointer if (A) a reference to the associated object is added by the write barrier procedure to the remembered set, or (B) the object pointer references an object in the youngest generation, in which case the object cannot contain a relevant intergenerational object pointer. A reference to the associated object is added by the write barrier procedure to the remembered set if, and only if, an object pointer to a younger generational object is added to the associated object.

In general, the criteria used by the write barrier procedure for adding an object to a list is very garbage collection system specific. In this invention, the focus is on using a filtering mechanism for avoiding duplicate executions of a write or read barrier procedure with respect to a particular object reference. By avoiding calls to the write or read barrier procedure whenever an object reference has already been processed by the write or read barrier procedure, the computational overhead associated with garbage collection is reduced.

In an alternate embodiment, a remembered set is used to store the location of all objects into which any object references have been stored, not just the objects in which intergenerational object references have been stored. While this adds some unnecessary items to the remembered set, which makes the collection phase of the garbage collector a little less efficient, calls to the write barrier procedure are reduced. During garbage collection, all entries in the remembered set are deleted except entries referencing objects having intergenerational object references from an older generation object to a younger generation object.

In another alternate embodiment, the instruction execution logic examines and sets the object header state flag, and an object reference state flag is not used. Accessing the object head state flag requires an extra memory reference operation on the object reference to locate the object header. In order to speed up this additional lookup, the object headers can be cached in a register or in an object header cache, just as the object reference is always cached in a register, and the instruction execution logic is modified to perform the lookup and update on the object header state flag in a parallel logic path so as not to incur any additional penalty for performing this extra level of indirection for accessing the object header instead of the object reference.

The present invention is also applicable incremental garbage college systems using read and/or write barriers.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
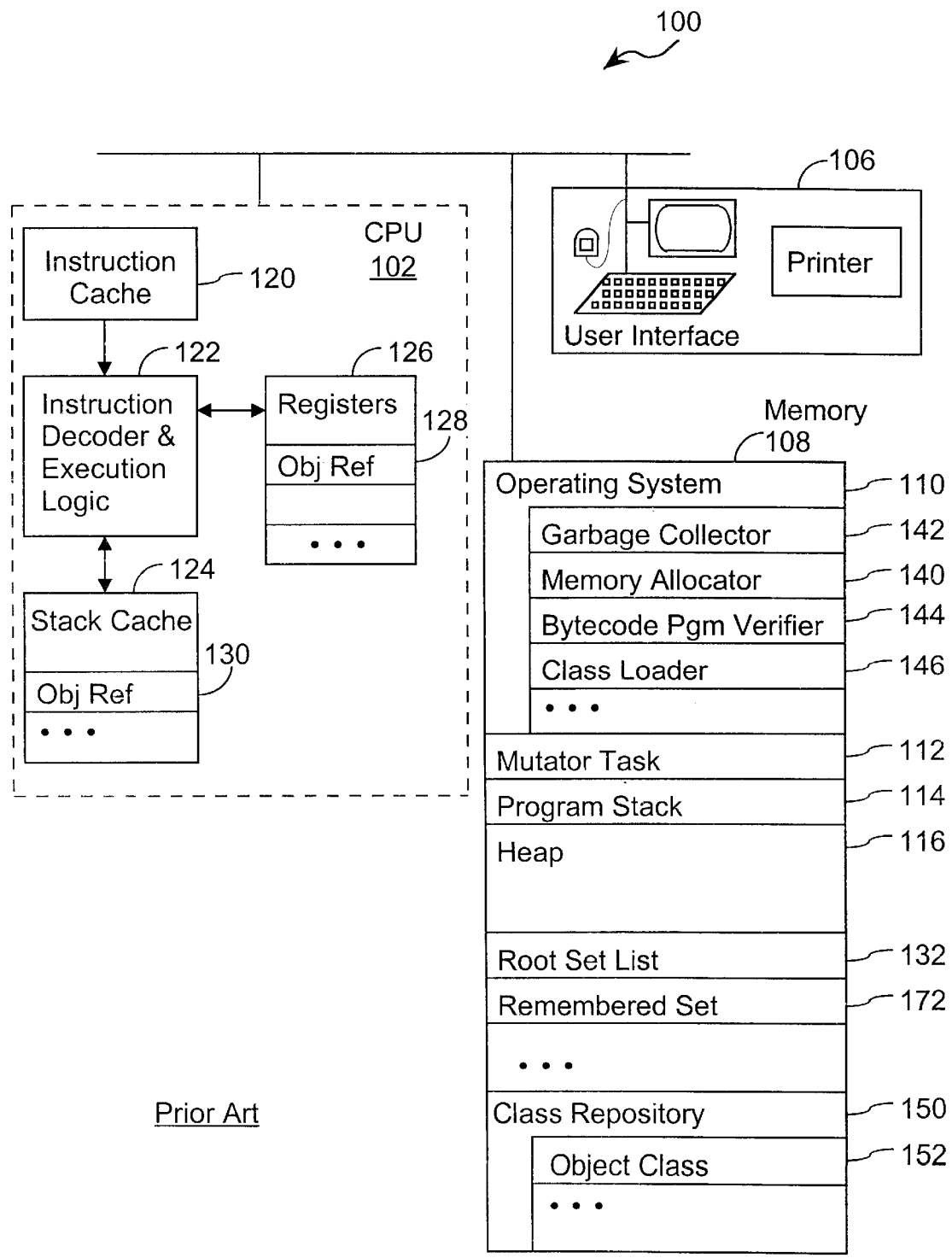
FIG. 1 is a block diagram of a computer system that utilizes garbage collection for recovery of memory space used by inaccessible objects.
Figure 2:
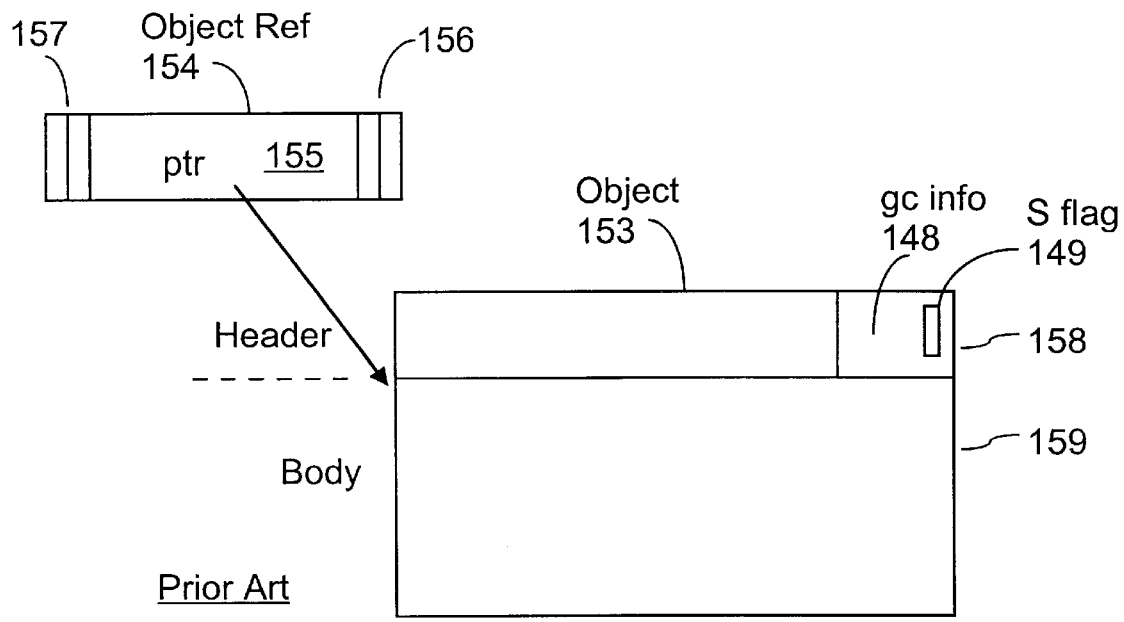
FIG. 2 is a block diagram of an object and an object reference.
Figure 3:
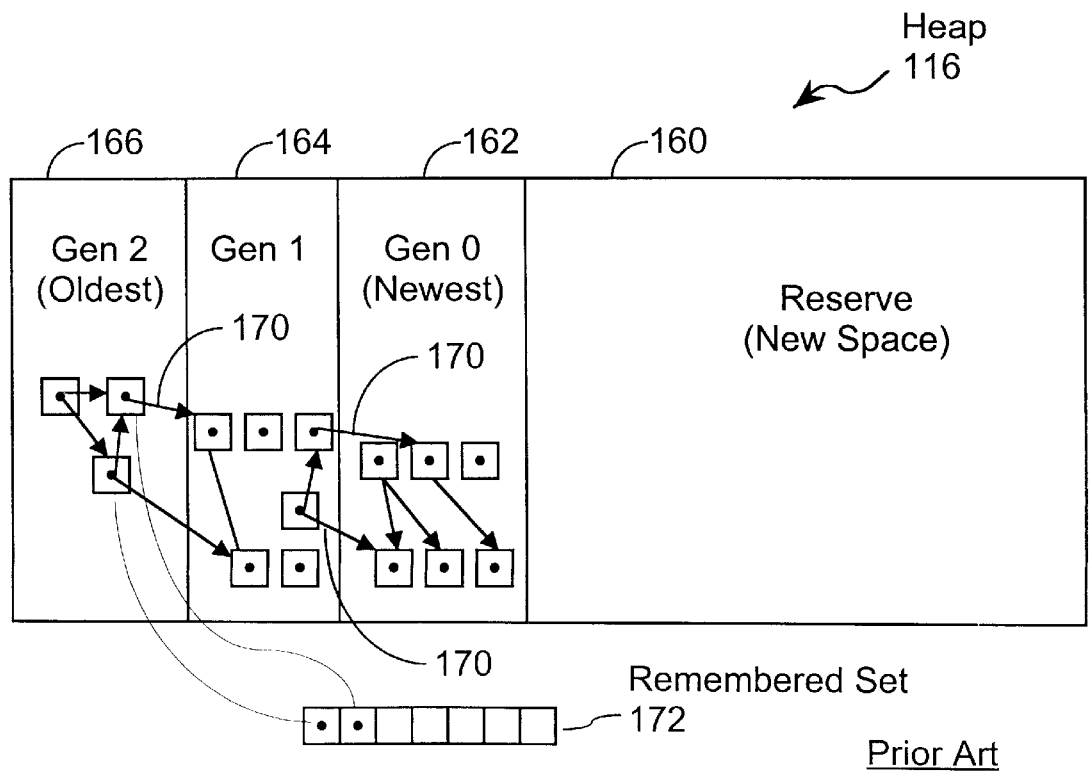
FIG. 3 is a block diagram of a memory heap used for storing objects in a generational garbage collection system.

In a preferred embodiment, the basic system architecture of FIG. 1 and the generational heap structure of FIG. 3 remain fully applicable. The basic data structures for objects and object references as shown in FIG. 2 are also applicable to the present invention, except that one of the unused bits (156, 157) in each object reference is now used as a State flag, as will be described below with reference to FIG. 5.

The definitions provided near the beginning of this document are applicable to the description of the preferred embodiments.

Figure 4:
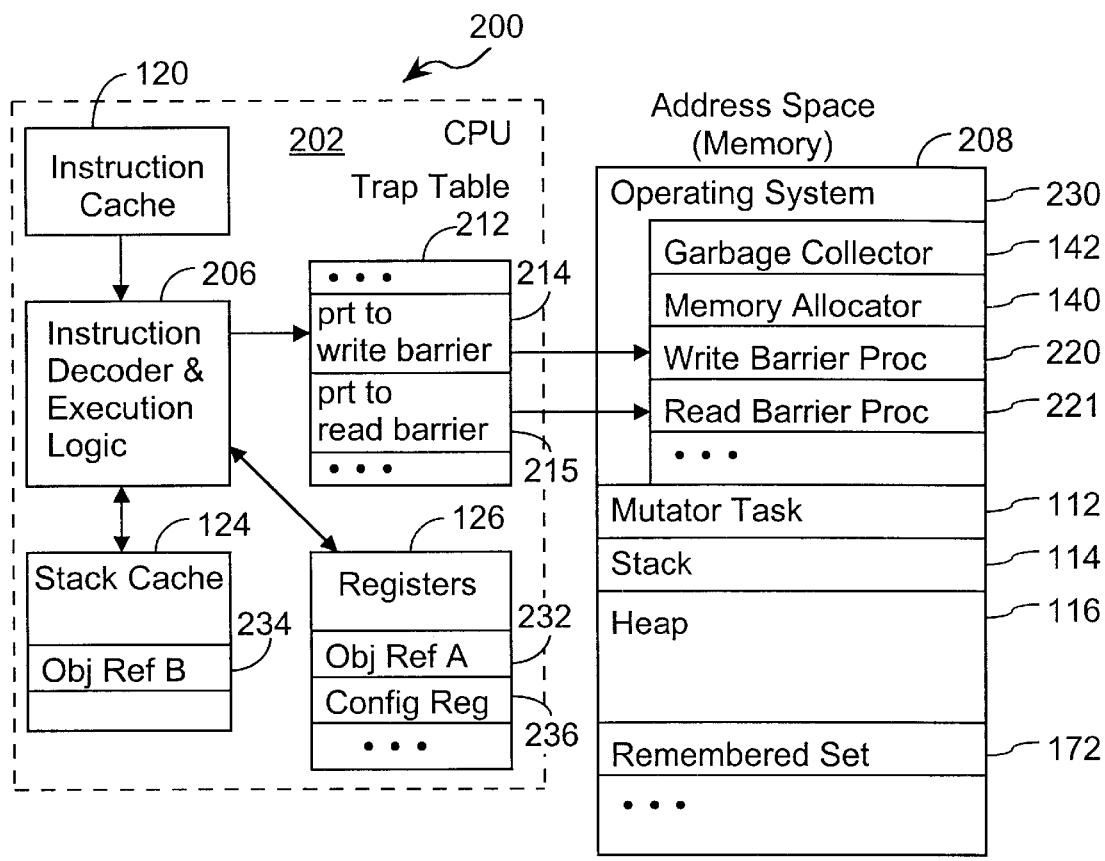
FIG. 4 is a block diagram of the CPU and memory of a computer system in a preferred embodiment of the present invention.

Referring to FIG. 4, there is shown the portions of a computer system 200 that differ from the basic system architecture of FIG. 1. Relevant details of the computer system's CPU 202 include improved instruction decoder and execution logic 206 and a trap table 212 for storing pointers to various interrupt and trap procedures. The computer system 200 includes memory 208 with additional procedures.

The trap pointers in the trap table 212 that are applicable to a garbage collection system that uses write or read barriers are a write barrier trap pointer 214 that points to a write barrier procedure 220 provided by the computer's operating system 230 and a read barrier trap pointer 215 that points to a read barrier procedure 221, also provided by the computer's operating system 230. The write and read barrier procedures 221 are described below.

For garbage collectors that do not use a trapping mechanism for performing write or read barriers, but instead rely on a compiler to inject the barrier instruction into the instruction stream itself, the trap table 212 is mainly symbolic, to indicate that such an operation exists, even if it is not invoked using a trap table. In the descriptions of the write and read barrier procedures provided in this document, it should be kept in mind that these are functional descriptions of the respective operations, and while in the preferred embodiments the write and read barriers are invoked through a trapping mechanism, it is not always necessary that they be invoked in this manner.

Also, in the "dirty bit" alternate embodiment of the State flag, there are no write or read barrier operations per se; the instruction execution logic simply sets the state bit. Later, a garbage collector or other procedure sweeps through memory and processes all the object or references whose State flag is set.

As shown, object references 232, 234 can be stored in the stack 114 and registers 126.

Figure 5:
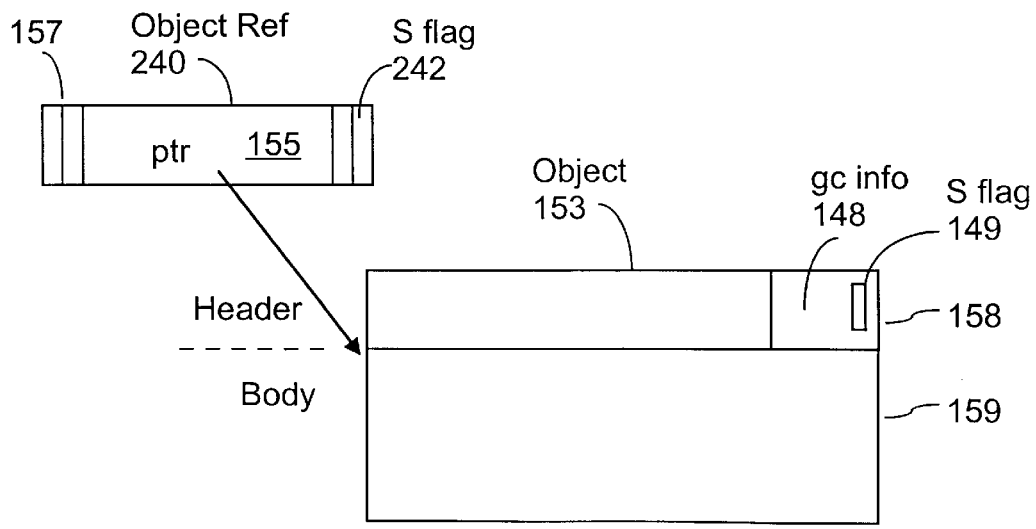
FIG. 5 is a block diagram of an object and an object reference in accordance with a preferred embodiment of the present invention.

As shown in FIG. 5, in a preferred embodiment each object reference 240 includes, in addition to a pointer 155 to an object, a State flag 242. The State flag 149 in the object header 150 is sometimes herein called the "object header State flag" to distinguish it from the object reference State flag 242 in the object reference.

After an object reference write operation, the object reference State flag 242 and the associated object's header State flag 149 (in the "target" object's header 158) are synchronized. In one preferred embodiment, these State flags will be set after the object reference write operation if, and only if, the target object is listed in the remembered set 172. In most other preferred embodiments the State flags 149, 242 in the object header and object reference are always set after a write (or read) barrier procedure is performed on the object reference.

The present invention performs operations in hardware, in the instruction execution logic 206, so as to avoid execution of the write barrier procedure 220 (or the read barrier procedure 221) when the hardware is able to determine that a write (or read) barrier has already been performed on the object reference currently being processed by the CPU. Avoiding execution of the write (or read) barrier procedure can substantially reduce the CPU overhead associated with garbage collection, which is important for fast or timely performance of various application program tasks.

Figure 6:
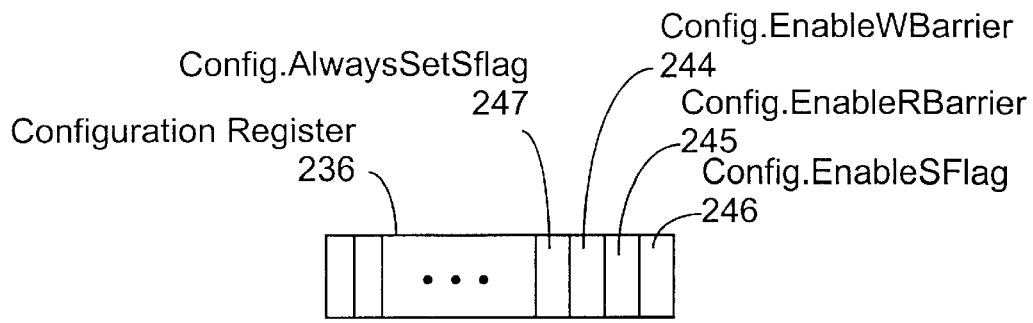
FIG. 6 depicts a configuration register.

Referring to FIG. 6, a configuration register 236 is used to store one or more flags that control the use of the State flag in object references 240 (see FIG. 5) or object headers 150. The control flags in the configuration register 236 are preferably set by the operating system at system initialization time, or program start up time. Some garbage collection systems may enable trapping on both read and write operations. In a preferred embodiment, the configuration register 236 includes the following configuration flags:

- a write barrier enable flag 244, which when set to True enables the execution of the write barrier procedure 220 each time an object reference write instruction is executed;
- a read barrier enable flag 245, which when set to True enables the execution of the read barrier procedure 221 each time an object reference write instruction is executed;
- a S flag enable flag 246, which when set to True enables the use of an S flag in each object reference for either write or read barrier filtering (as determined by which one of the write or read barrier enable flags is enabled) in accordance with the present invention; and
- an "Always set S flag" flag 247, which when set causes the instruction execution logic to always set the S flag in an object reference when (A) the S flag enable flag is set to True and (B) a read or write barrier is performed on that object reference.

To simplify the remainder of this document, the invention will be described with respect to a filtering mechanism for avoiding duplicate executions of a write barrier procedure, except where otherwise indicated. However, the invention is equally applicable to filtering read barriers.

Referring to FIGS. 4, 5, 6, 7 and 8, in the preferred embodiment the computer system 200 executes "Java" (a trademark of Sun Microsystems, Inc.) bytecode programs. The Java language includes a specific, dedicated bytecodes for object reference write operations and other dedicated bytecodes for object reference read operations. In particular, there is a set of unique bytecodes for writing data into the fields of objects, for which an associated write barrier operation may be defined by certain garbage collection systems, and there is also a set of unique bytecodes for reading data from the fields of objects, for which an associated read barrier operation may be defined by other garbage collection systems.

As shown in FIG. 6, whenever an object reference write instruction is executed by the CPU 202, the instruction decoder and execution logic 206 performs the following sequence of operations under the control of a "write object reference" state machine 250:

In state 251 the current instruction is decoded.

In state 252, if the current instruction is not an object reference write instruction, it is executed using mechanisms not relevant to the present invention (however, execution of object reference read instructions is discussed below).

In state 254, if the current instruction is an object reference write instruction, the execution logic 206, performs the specified object reference write operation. For instance, an object reference (ObjectRefB) may be stored in a specified target object (which is referenced by ObjectRefA).

After completing the object reference write operation in state 254, if the configuration flags for enabling the use of S flags (Config.EnableSflag) and for enabling write barriers (Config.EnableWBarrier) are both set to True, then the State flag in the object reference being processed (i.e., ObjectRefA, the object reference to the target object) is tested in state 256. If the State flag in ObjectRefA is set to True, there is no need to execute the write barrier procedure because the object reference has already been processed by the write barrier procedure, and therefore the state machine returns to state 251.

If the State flag in ObjectRefA is set to False and the machine is configured to always set the State flag when a write barrier is invoked (Config.AlwaysSetSflag= True), the State flag in the object reference being processed (ObjectRefA) is set by the instruction execution logic in State 257 and then the write barrier procedure is invoked by state 258.

If the State flag in ObjectRefA is set to False and the computer system is not configured to always set the State flag when a write barrier is invoked (Config.AlwaysSetSflag=False), then the write barrier procedure is invoked by state 258 without first setting the State flag.

After the write barrier procedure completes, the state machine returns to state 251.

Figure 7:
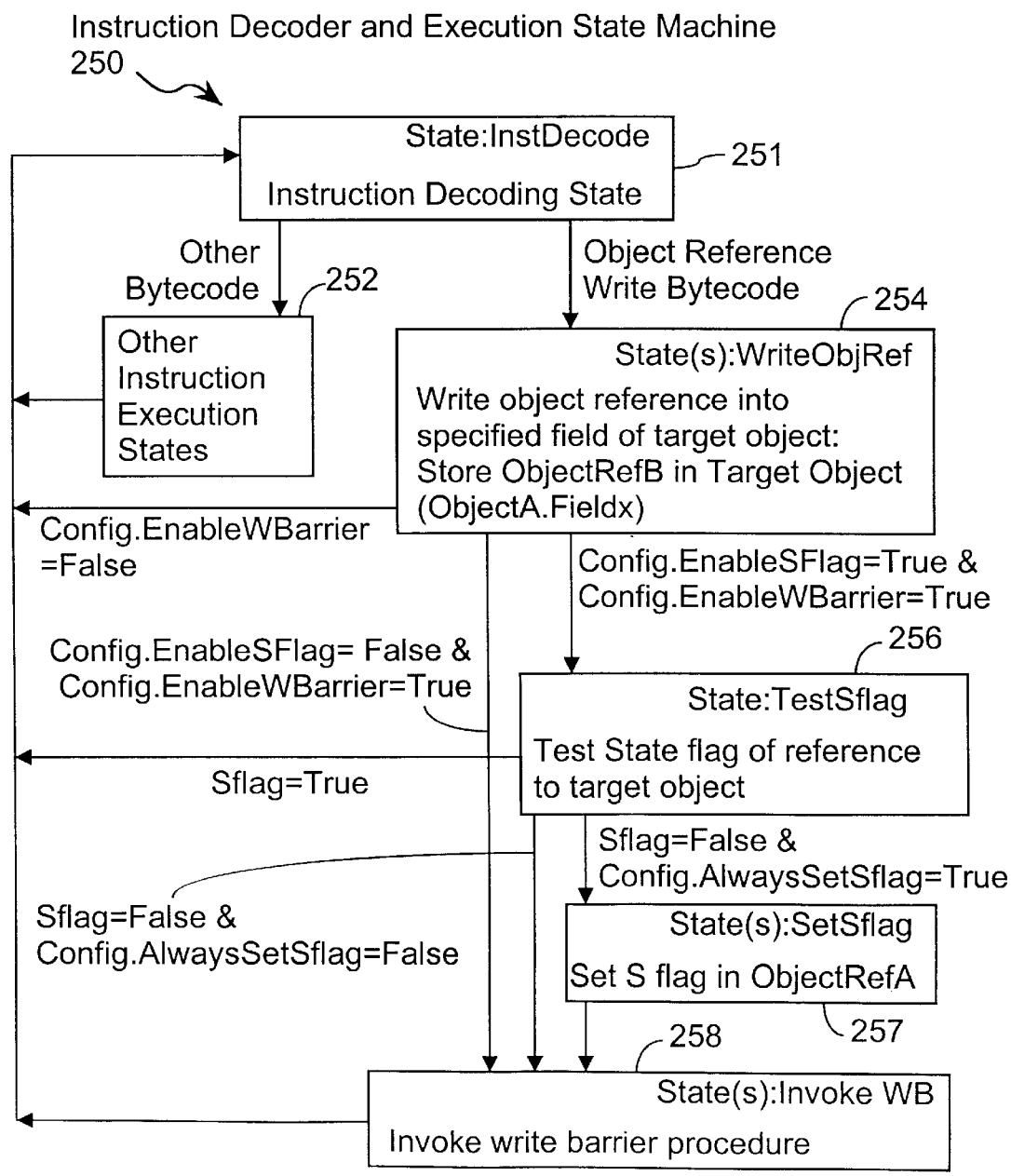
FIG. 7 depicts a state machine implementation of instruction decoder and execution logic in a preferred embodiment of the present invention.

FIG. 7 shows an exemplary write barrier procedure for a generational garbage collection system in which the configuration register is set to enable write barriers (Config.EnableWBarrier=True and Config.EnableRBarrier= False), to enable the use of the State flag in object references (Config.EnableSflag=True) and to disable the automatic setting of the State flag when a write barrier is performed (Config.AlwaysSetSflag=False). The automatic setting of the State flag is disabled because in the embodiment shown in FIG. 7, the write barrier determines whether or not to set the State flag.

More particularly, in this embodiment the State flag in an object reference is set only if the object reference is added to the remembered set or if the referenced object is currently in the youngest generation, as will be described in more detail with reference to step 266.

The first step of the write barrier procedure is to check the State bit in the target object's header (260). If the State bit in the object header is set, this means that the remembered set already has a pointer or reference to the target object. As a result, the State bit in the target object reference is set (262), and execution of the bytecode is complete.

If the State bit in the object header is not set, the write barrier procedure performs a predefined garbage collection function (266). In this preferred embodiment, the write barrier procedure checks to see if predefined criteria for storing a pointer to the target object in the remembered set are met. For instance, the predefined criteria in one preferred embodiment is that the datum stored in the target object must be an intergenerational reference that points from an older generation object to a newer generation object. Further, if the write barrier does not write the object reference to the remembered set and the target object is not a youngest generation object, the write barrier procedure aborts so as to prevent the State flag in the object reference ObjectRefA from being set.

If the write barrier procedure does not abort in step 266, the State flag in the target object's header is set in step 268, and the State flag is also set in the object reference being processed, ObjectRefA, in step 262. Then the write barrier procedure exits.

Figure 9:
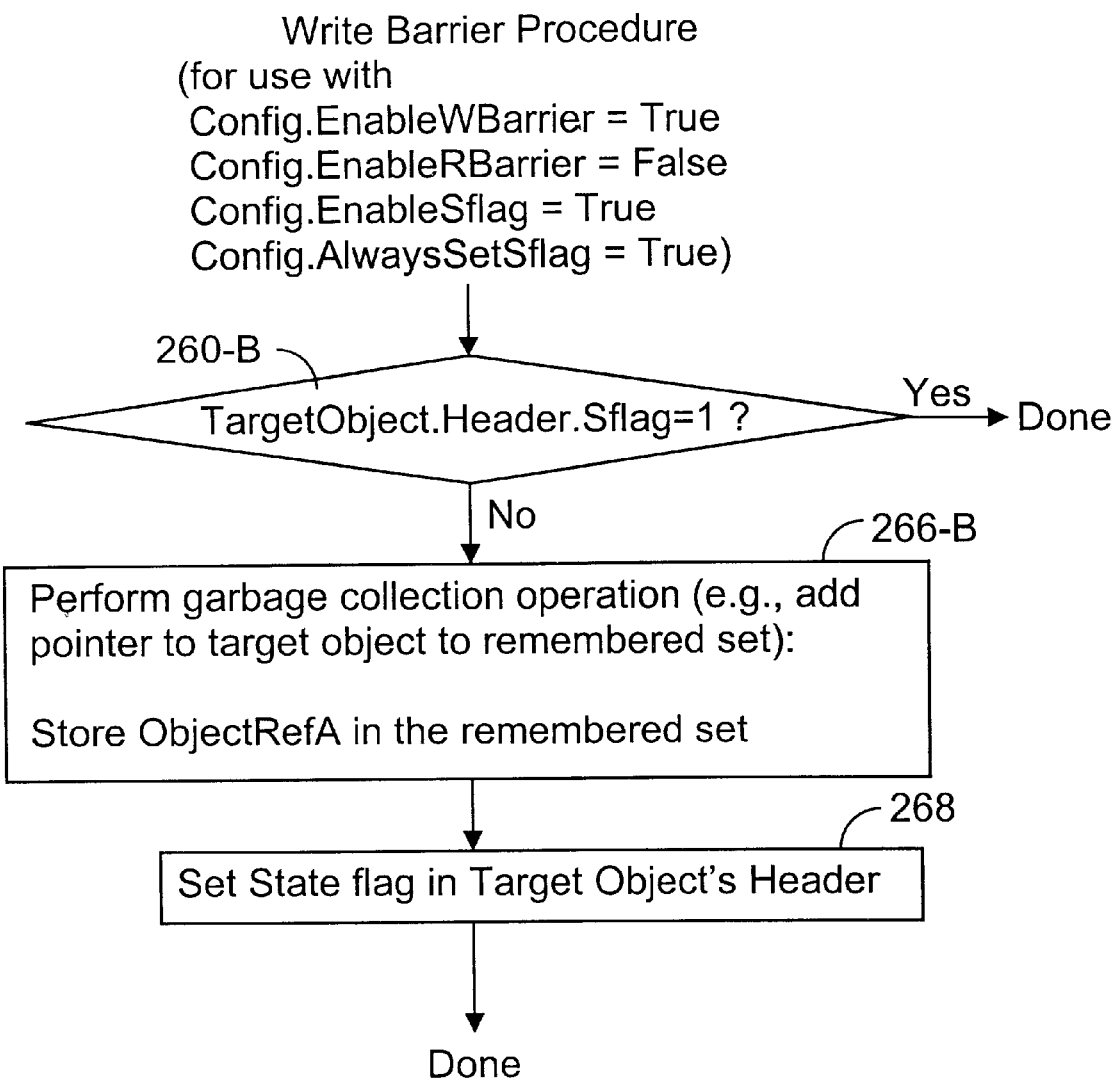
FIG. 9 is a flow chart of the steps performed by a write barrier procedure in a second preferred embodiment.

Referring to FIG. 9, in an alternate embodiment of the invention, a reference to the target object is always stored in the remembered set when the write barrier operation is performed, and the object reference State flag is always set when a write barrier is performed. Thus in this embodiment the configuration register is set to enable write barriers (Config.EnableWBarrier=True), to disable read barriers Config.EnableRBarrier=False), to enable the use of the State flag in object references (Config.EnableSflag=True) and to enable the automatic setting of the State flag when a write barrier is performed (Config.AlwaysSetSflag=False).

Figure 8:
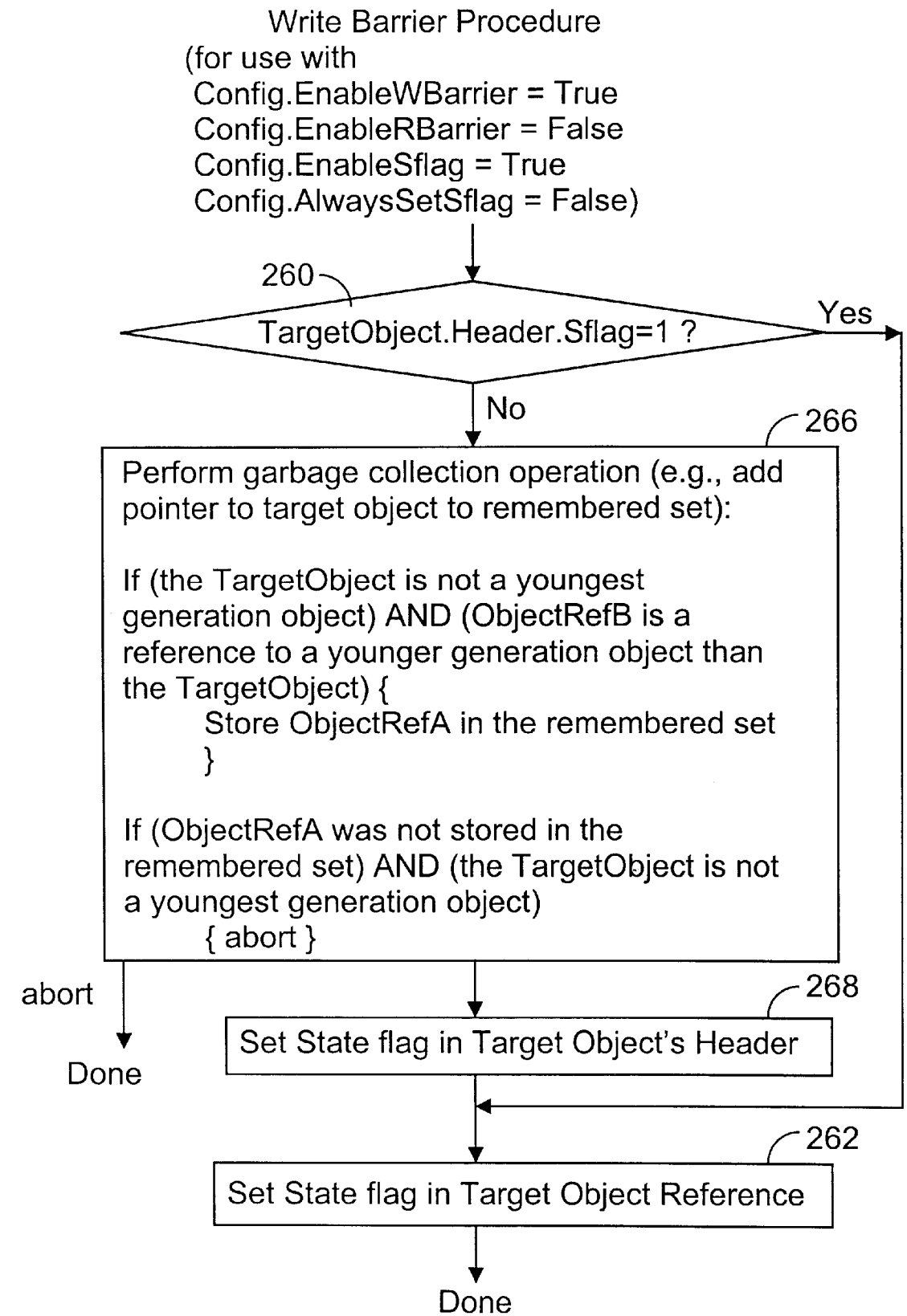
FIG. 8 is a flow chart of the steps performed by a write barrier procedure in a preferred embodiment.

Since the State flag is automatically set by the instruction execution logic (in state 257 of FIG. 7), the write barrier procedure does not need to perform that step, and thus step 262 of FIG. 8 is eliminated in this embodiment. Further, in step 260-B, if the write barrier procedure determines that the State flag in the target object's header is already set, the procedure exits because there is nothing further for the write barrier procedure to do. Finally, if the State flag in the target object's header is not already set, the write barrier procedure stores a reference to the target object in the remembered set (step 266-B), sets the State flag in the target object's header (step 268-B), and then exits.

In another alternate embodiment, where State flags are stored only in object references and not in object headers, steps 260 and 268 are eliminated from the write barrier procedures shown in FIGS. 8 and 9.

Embodiment Using only Object Header State Flags

Figure 10:
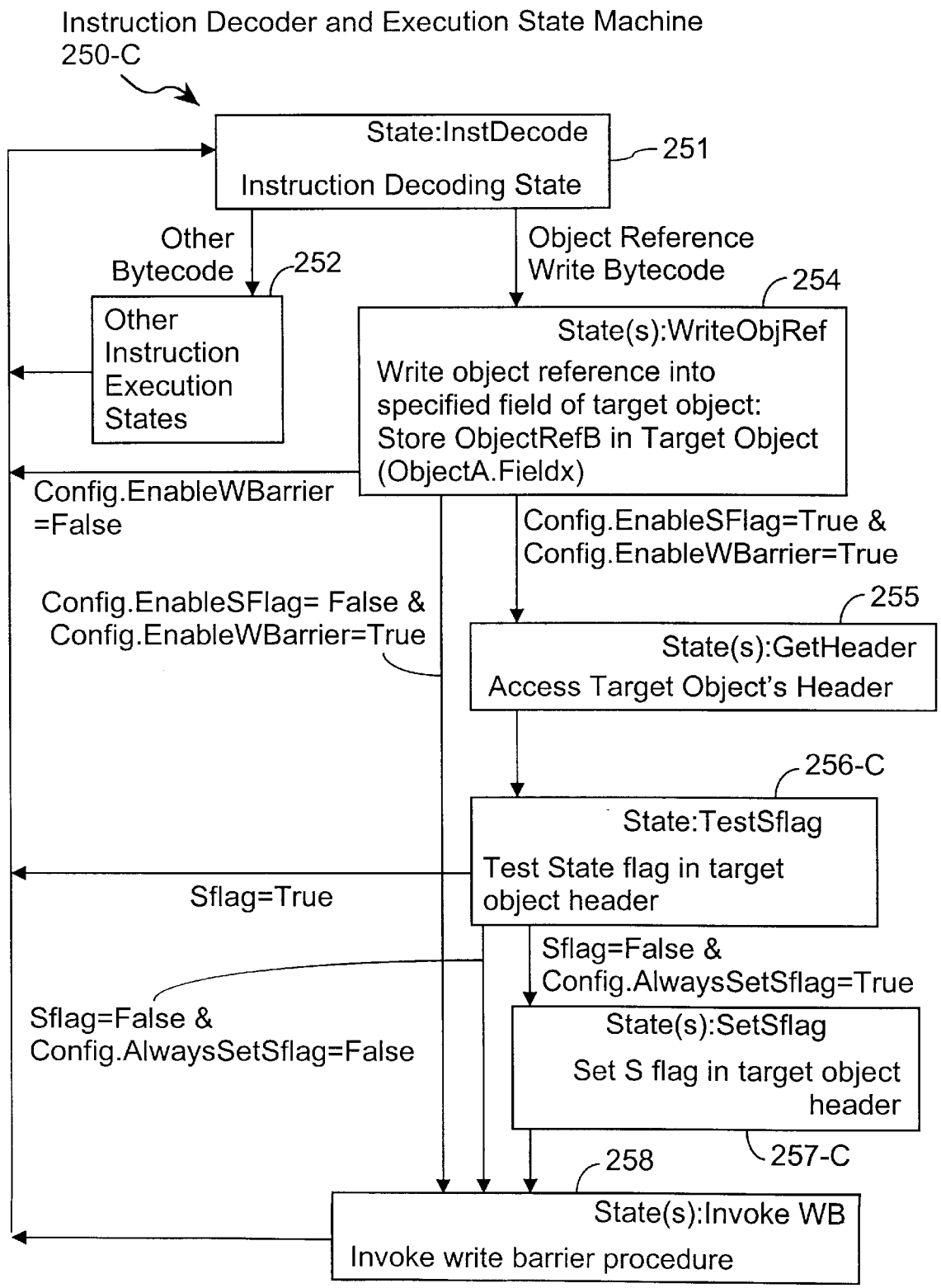
FIG. 10 depicts a state machine implementation of instruction decoder and execution logic in a third preferred embodiment of the present invention.
Figure 11:
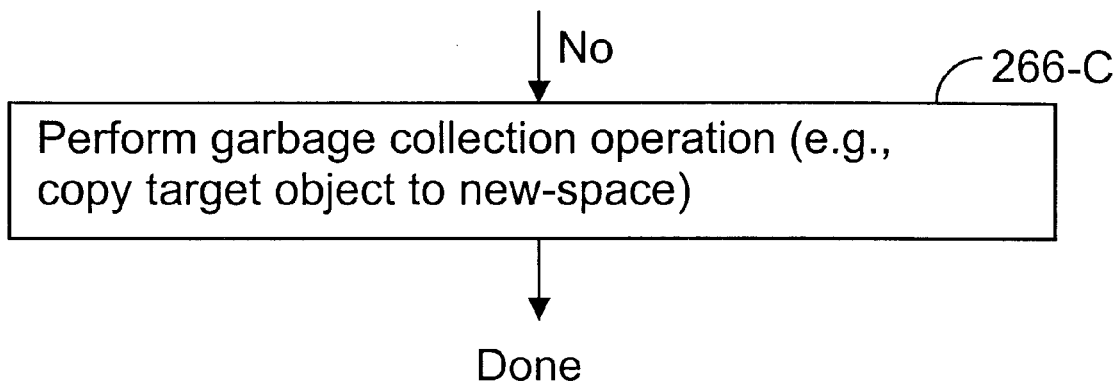
FIG. 11 is a flow chart of the steps performed by a write barrier procedure in the third preferred embodiment.

Referring to FIGS. 10 and 11, in another alternate embodiment State flags are stored only in object headers, and not in object references. The primary difference between this embodiment and the previously described embodiment (see FIGS. 7 and 9) is that an additional memory reference is required to look up the object header to locate the State bit in order to perform the read/write barrier filtering operation. The instruction execution logic state machine 250-C for this embodiment (shown in FIG. 10) includes an additional state 255 for accessing the header of an object into which an object reference. In state 256-C, the State flag in the object header is tested, and in state 257-C the State flag in the object header is set to True if the State flag was not already set to True and the computer system is configured to always set the State flag when a write barrier is performed (Config.AlwaysSetSflag=True). Otherwise, the state machine 250-C is same as that shown in FIG. 7.

Accessing the object head state flag requires an extra memory reference operation on the object reference to locate the object header. In order to speed up this additional lookup, the object headers can be cached in a register or in an object header cache, just as the object reference is always cached in a register when an object reference write operation is executed. The instruction execution logic is preferably modified to perform the lookup and update on the object header state flag in a parallel logic path so as not to incur any additional penalty for performing this extra level of indirection for accessing the object header instead of the object reference.

The write barrier procedure for this embodiment, shown in FIG. 11, is very simple in that it simply performs the garbage collection operation dictated by the particular garbage collection system being used (step 266-C). This embodiment assumes that the State flag is always set when a write barrier is performed. If the setting of the State flag is conditional, then a conditional execution step comparable to step 268 of FIG. 9 would need to be added to the write barrier procedure of FIG. 11.

In other types of garbage collection systems such as incremental garbage collection systems, the garbage collection operation performed in step 266 (of FIGS. 8, 9 and 11) will be different (incremental) garbage collection operation, but otherwise the operation of the instruction execution logic and write barrier procedure may remain substantially the same as shown in FIGS. 7, 8, 9, 10 and 11.

Generally, the present invention is useful for reducing the number of write (or read) barrier procedure calls used in any type of garbage collection system.

Root Set Locator Procedure

In a generational garbage collection system that uses a remembered set, the remembered set is used as part of the root set during each garbage collection cycle.

Figure 12:
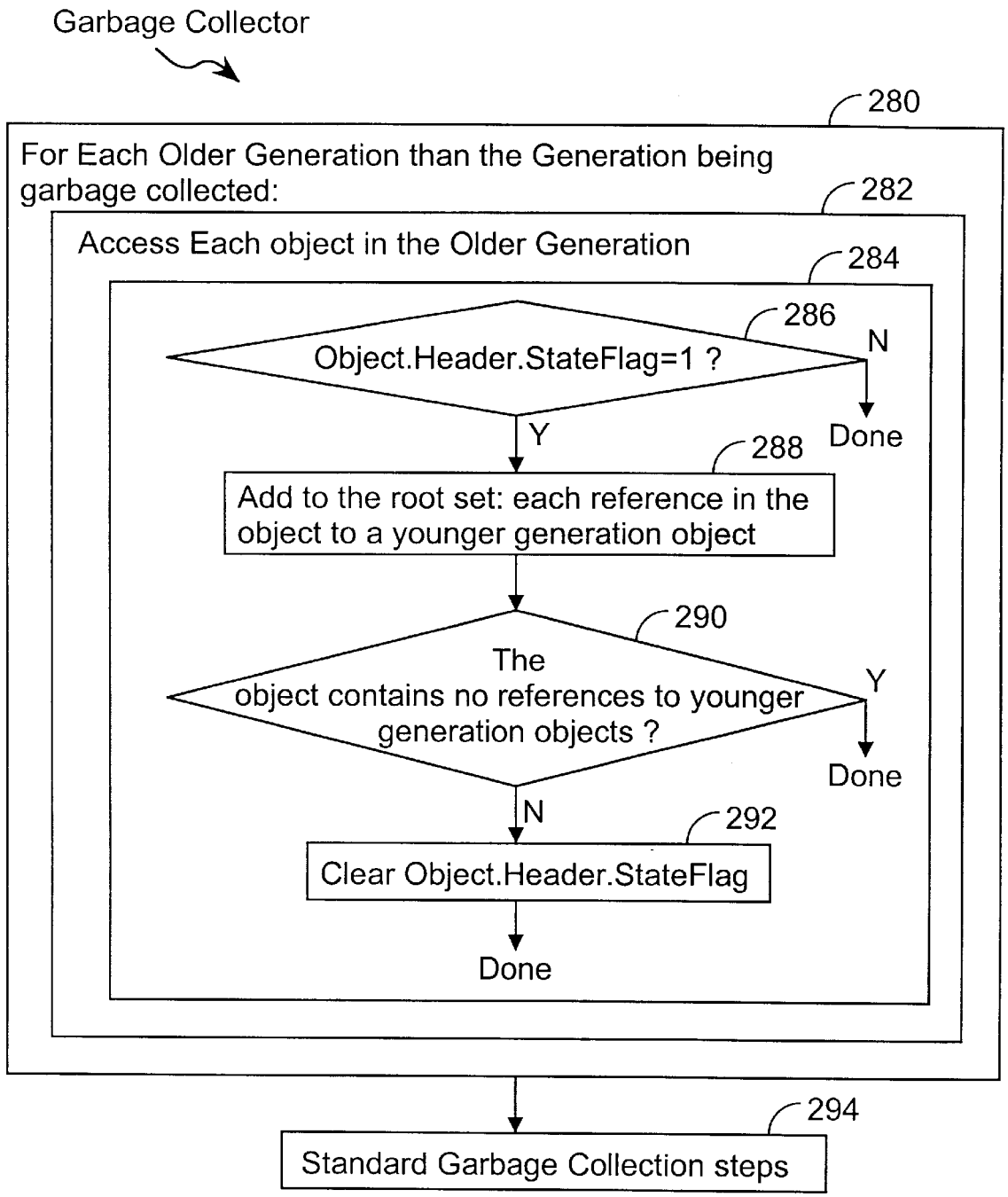
FIG. 12 is a flow chart of the steps performed by the root set locator procedure of a generational garbage collection system that does not use a remembered set or similar list data structure.

Referring to FIG. 12, there is shown a flow chart for a portion of the root set locator procedure used by a generational garbage collection system that does not use a remembered set. During the garbage collection of each younger generation (i.e., each generation other than the oldest generation) (280), the objects in each older generation (282) are scanned (284) to identify objects with a set State flag (286), and those objects are then scanned to find intergenerational object references, if any, relevant to the garbage collection operation being performed. Each relevant intergenerational object reference (e.g., from an older generation object to a younger generation object) is added to the root set of object pointers (288). Objects whose State flag is set but that contain no relevant intergenerational object references (290) have their State flag reset during garbage collection (292). After the root set has been supplemented with all relevant intergenerational object references, standard garbage collection processing is performed (294) on the heap generation being garbage collected.

Read Barrier Embodiments

Figure 13:
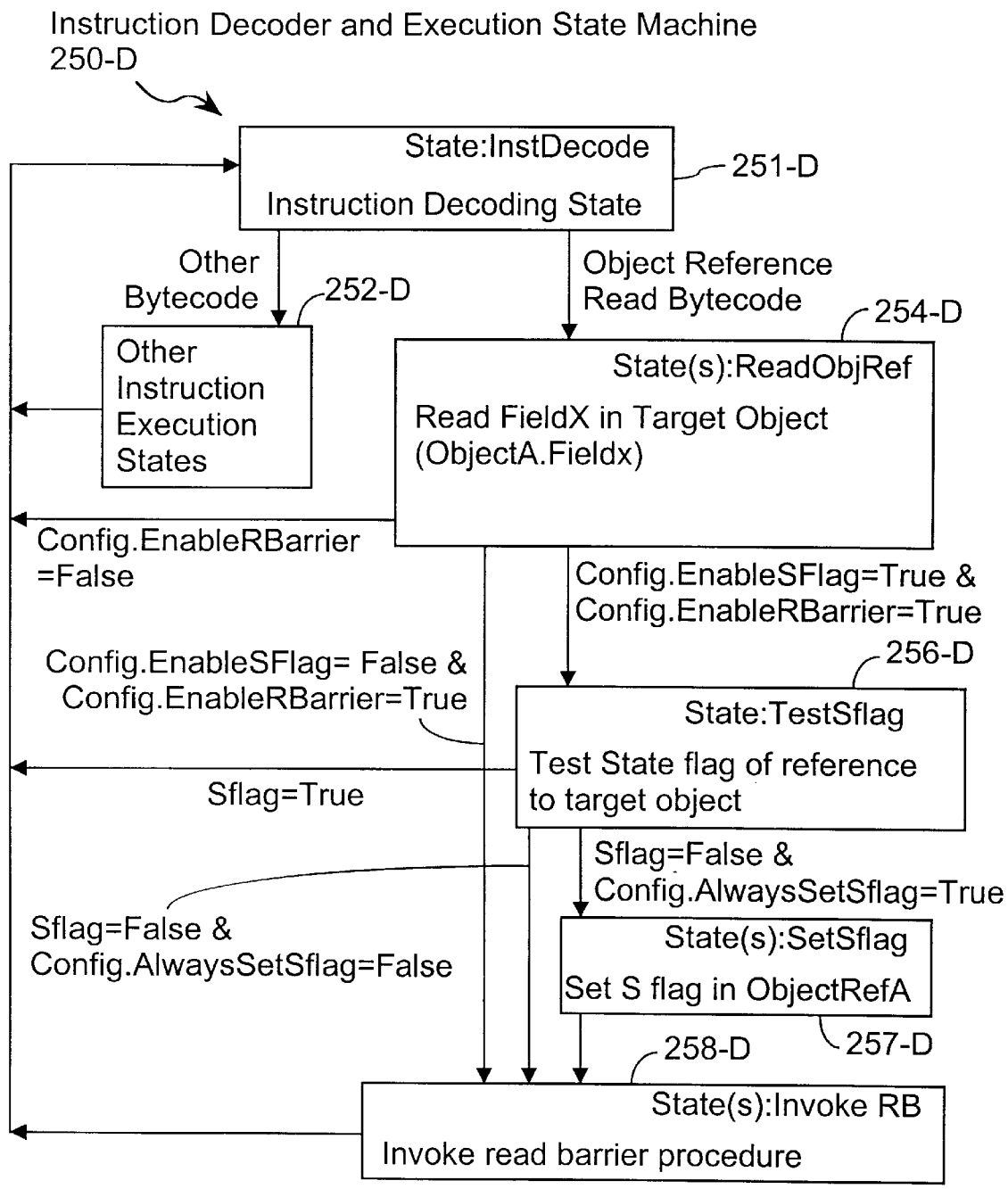
FIG. 13 depicts a state machine implementation of instruction decoder and execution logic in a fourth preferred embodiment of the present invention that uses a read barrier procedure.
Figure 14:
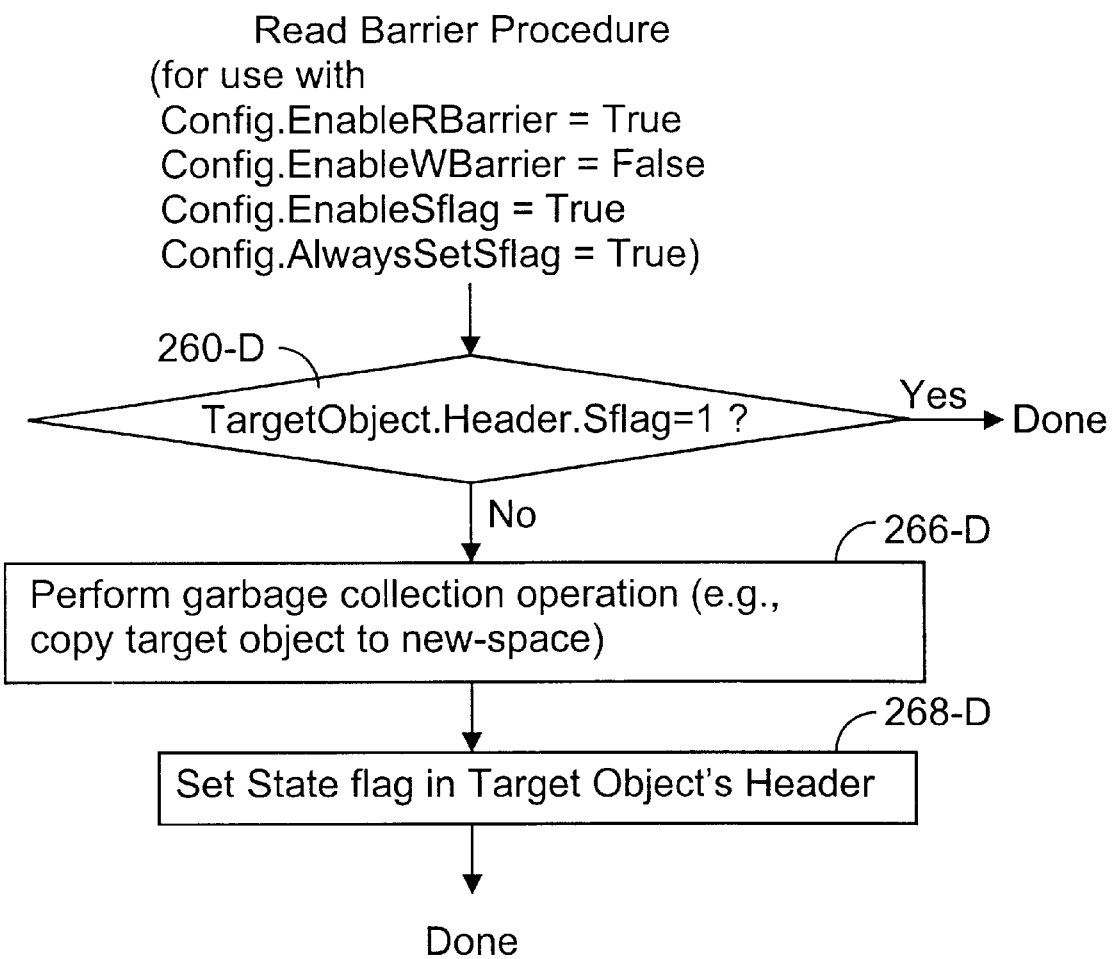
FIG. 14 is a flow chart of the steps performed by a read barrier procedure in the fourth preferred embodiment.

Referring to FIGS. 13 and 14, the present invention is also applicable to garbage collection systems using a read barrier procedure. Instead of saving the object reference to a remembered set, another (typically incremental) garbage collection operation is performed in the read barrier procedure. In the read barrier embodiments, the State bit in each object reference signifies that the object reference has already been processed by the read or write barrier procedure in the current garbage collection cycle.

FIG. 13 represents a state machine 250-D implementation of the portion of the instruction decoder and execution logic 206 for handling read instructions that can cause a read barrier to be executed, such as a read object reference instruction. The states of this state machine 250-D are similar to those of the state machine 250 shown in FIG. 7, except that state 254-D is used to perform a read operation; and state 258-D is used to invoke a read barrier procedure.

States 256-D and 257-D perform the same State flag test and set functions as states 256 and 257 in the state machine 250 of FIG. 7.

The read barrier procedure shown in FIG. 14 is similar to the write barrier procedure of FIG. 9, except that the garbage collection operation performed in step 266-D is one appropriate for a read barrier instead one appropriate for a write barrier.

Alternate Embodiments

The present invention, by providing hardware based checking of the State flag in object references, saves computer resources whenever the same object reference is used to specify the target object for more than one object reference write or read operation. Since writing multiple references into (and reading multiple references from) a single object is very common, the invention reduces write or read barrier operations significantly in systems that use write or write barrier based garbage collection techniques for storage reclamation.

The present invention can also be implemented solely in software, by making the very first instruction of the write or read barrier procedure test the State flag of the object reference being written or read. While slightly less efficient that using hardware to check the State flag of an object reference, the pure software implementation still efficiently filters out unnecessary executions of the majority of the write or read barrier instructions.

In some alternate embodiments, the object reference write operation could be performed after executing the write barrier operation, if any, instead of before it. However, execution of the write operation before the write barrier operation is preferred because if there is a cache conflict between the object reference write instruction and the write barrier procedure instructions, executing the write instruction may cause an unnecessary cache miss.

The write barrier and read barrier filtering mechanism of the present invention is suitable for virtually all garbage collection systems that utilize write or read barriers. The particular garbage collection methodology used is a policy issue not relevant to the basic operation of the present invention. The present invention is applicable to other prior art garbage collection techniques not described in this document, as well as future ones yet to be invented.

The present invention's method of filtering read and write barriers can be applied to any type of instruction that requires a dependent trap on its operand based on some prior state of that operand, where the state information is present either directly in the operand itself (e.g., in an object reference State flag) or derived through an additional lookup in a cache or memory location (e.g., in an object header State flag).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of reducing execution write/read barrier procedures in a computer system, comprising the steps of:
   (A) storing in a computer memory objects and object references for accessing the objects, each object reference including a State flag;
   (B) executing instructions stored in the computer memory, a subset of the executed instructions having associated therewith a write/read barrier procedure; wherein each instruction in the subset processes an object reference to a respective one of the objects stored in the computer memory;
   (C) when executing each instruction that has an associated write/read barrier procedure,
      (C1) determining whether the State flag of the object reference being processed is set to a first predefined value;
      (C2) when the determination in step C1 is positive, skipping execution of the write/read barrier procedure associated with the instruction being executed and proceeding with execution of a next instruction; and
      (C3) when the determination in step C1 is negative, executing the write/read barrier procedure associated with the instruction being executed.

2. The method of claim 1, wherein step C3 further includes setting to the first predefined value the State flag in the object reference being processed.

3. The method of claim 2, wherein the steps of the method are performed by instruction execution logic, without execution of any instructions other than the object reference accessing instruction.

4. The method of claim 1, wherein step C3 further includes conditionally setting to the first predefined value the State flag in the object reference being processed when predefined criteria with respect to the object reference being processed are satisfied.

5. The method of claim 1, wherein the subset of the executed instructions having associated therewith a write/read barrier procedure are object reference write instructions having associated therewith a write barrier procedure.

6. The method of claim 1, each object stored in the computer memory having an object header with a State flag therein;
   the step of executing the write/read barrier procedure, in step C3, including:
      (C3A) accessing the object header of the respective object referenced by the object reference being processed and determining whether the State flag in the respective object's header is set to the first predefined value; and
      (C3B) when the determination in step C3A is positive, exiting the write/read barrier procedure;
      (C3C) when the determination in step C3A is negative, continuing with execution of the write/read barrier procedure.

7. The method of claim 6, wherein step C3B includes setting the State flag in the object reference being processed to the first predefined value prior to exiting the write/read barrier procedure.

8. The method of claim 6, wherein step C3C includes setting to the first predefined value the State flag in the object reference being processed and the State flag in the respective object's header.

9. A method of executing an object reference write bytecode in a computer program in a computer system using generational garbage collection and a remembered set to store pointers to objects that may store references to other objects, comprising the steps of:
   (A) executing an object reference write bytecode by writing a specified object reference into a specified field of a target object identified by a target object reference;
   (B) testing a State flag in the target object reference to determine whether the State flag is set or clear;
   (C) when the testing step determines that the State flag in the target object reference is clear, invoking a predefined write barrier procedure to perform a predefined write barrier operation;
   (D) when the testing step determines that the State flag in the target object reference is set, proceeding with execution of a next bytecode.

10. The method of claim 9, wherein the steps of the method are performed by instruction execution logic, without execution of any bytecodes other than the object reference write bytecode.

11. The method of claim 9, further including executing the invoked write barrier procedure by:
   (E) testing a header State flag in a header of the target object to determine whether the header State flag is set or clear;
   (F) when the testing step determines that the header State flag in the target object reference is clear, adding a reference to the target object to a predefined remembered set data structure, and setting the header State flag and the State flag in the target object reference;
   (G) when the testing step determines that the header State flag in the target object reference is set, setting the State flag in the target object reference and exiting the write barrier procedure without adding a reference to the target object to the predefined remembered set data structure.

12. A computer system that include a garbage collection mechanism, comprising:

a memory for storing objects and object references for accessing the objects, each object reference including a State flag; and a data processor for executing instructions stored in the computer memory, a subset of the executed instructions having associated therewith a write/read barrier procedure; wherein each instruction in the subset processes an object reference that references a respective one of the objects stored in the computer memory;

the data processor including instruction execution logic that, when executing each instruction that has an associated write/read barrier procedure, (C1) determines whether the State flag of the object reference being processed is set to a first predefined value;

(C2) when the State flag value determination is positive, skips execution of the write/read barrier procedure associated with the instruction being executed and proceeds with execution of a next instruction; and (C3) when the State flag value determination is negative, invokes execution of the write/read barrier procedure associated with the instruction being executed.

13. The computer system of claim 12, wherein the instruction execution logic includes logic for setting the State flag in the object reference being processed to the first predefined value when the State flag value determination is negative.

14. The computer system of claim 12, wherein the instruction execution logic includes logic for conditionally setting the State flag in the object reference being processed to the first predefined value when the State flag value determination is negative and when predefined criteria with respect to the object reference being processed are satisfied.

15. The computer system of claim 12, wherein the subset of the executed instructions having associated therewith a write/read barrier procedure are object reference write instructions having associated therewith a write barrier procedure.

16. The computer system of claim 12, each object stored in the computer memory having an object header with a State flag therein;

the write/read barrier procedure including instructions for:

(C3A) accessing the object header of the respective object referenced by the object reference being processed and determining whether the State flag in the respective object's header is set to the first predefined value; and (C3B) when the determination by the C3A instructions is positive, exiting the write/read barrier procedure;

(C3C) when the determination by the C3A instructions is negative, continuing with execution of the write/read barrier procedure.

17. The computer system of claim 16, wherein the C3B instructions include instructions for setting the State flag in the object reference being processed to the first predefined value prior to exiting the write/read barrier procedure.

18. The computer system method of claim 6, wherein the C3C instructions include instructions for setting to the first predefined value the State flag in the object reference being processed and the State flag in the respective object's header.

19. A computer system that includes a generational garbage collection mechanism, comprising:

a memory for storing objects, object references for accessing the objects, and a predefined remembered set data structure, the predefined remembered set data structure storing a list of object references, each object reference including a State flag; and a data processor for executing bytecode instructions, including object reference write bytecode instructions for writing a datum into a specified field of a target object identified by a target object reference; the object reference write bytecode instructions having associated therewith a write barrier procedure;

the data processor including instruction execution logic that, when executing each object reference write bytecode instruction:

(C1) determines whether the State flag of the target object reference is set to a first predefined value;

(C2) when the State flag value determination is positive, skips execution of the write barrier procedure and proceeds with execution of a next bytecode instruction; and (C3) when the State flag value determination is negative, invokes execution of the write barrier procedure.

20. The computer system of claim 19, each object stored in the computer memory having an object header with a State flag therein;

the write barrier procedure including instructions for:

(C3A) testing a header State flag in a header of the target object to determine whether the header State flag is set to the first predefined value;

(C3B) when the State flag determination by the C3A instructions is negative, adding a reference to the target object to the predefined remembered set data structure, and setting the header State flag and the State flag in the target object reference;

(C3C) when the State flag determination by the C3A instructions is positive, setting the State flag in the target object reference and exiting the write barrier procedure without adding a reference to the target object to the predefined remembered set data structure.

* * * * *